US009507799B1

(12) United States Patent
Goodson et al.

(10) Patent No.: US 9,507,799 B1
(45) Date of Patent: Nov. 29, 2016

(54) DISTRIBUTED OBJECT STORE FOR NETWORK-BASED CONTENT REPOSITORY

(75) Inventors: Garth Goodson, Fremont, CA (US); Shankar Pasupathy, Milpitas, CA (US); Kaladhar Voruganti, San Jose, CA (US); Ravi Kavuri, Inver Grove Heights, MN (US); Sudhir Srinivasan, Acton, MA (US)

(73) Assignee: NetApp, Inc., Sunnyvale, CA (US)

( * ) Notice: Subject to any disclaimer, the term of this patent is extended or adjusted under 35 U.S.C. 154(b) by 750 days.

(21) Appl. No.: 12/633,725

(22) Filed: Dec. 8, 2009

(51) Int. Cl.
*G06F 17/30* (2006.01)

(52) U.S. Cl.
CPC ............... *G06F 17/30203* (2013.01)

(58) Field of Classification Search
USPC .............. 707/609, 796, 999.001–999.005
See application file for complete search history.

(56) References Cited

U.S. PATENT DOCUMENTS

| | | | |
|---|---|---|---|
| 5,544,360 A | 8/1996 | Lewak et al. | |
| 6,055,543 A | 4/2000 | Christensen et al. | |
| 7,028,071 B1 | 4/2006 | Slik | |
| 7,065,616 B2 | 6/2006 | Gajjar et al. | |
| 7,143,307 B1 | 11/2006 | Witte et al. | |
| 7,171,469 B2 | 1/2007 | Ackaouy et al. | |
| 7,191,290 B1 | 3/2007 | Ackaouy et al. | |
| 7,284,030 B2 | 10/2007 | Ackaouy et al. | |
| 7,376,796 B2 | 5/2008 | Corbett et al. | |
| 7,415,506 B2 | 8/2008 | Gajjar et al. | |
| 7,467,169 B2 | 12/2008 | Gole et al. | |
| 7,512,673 B2 | 3/2009 | Miloushev et al. | |
| 7,546,486 B2 | 6/2009 | Slik et al. | |
| 7,552,223 B1 | 6/2009 | Ackaouy et al. | |
| 7,590,672 B2 | 9/2009 | Slik et al. | |
| 7,831,735 B1 | 11/2010 | Kabra et al. | |
| 7,873,619 B1 * | 1/2011 | Faibish et al. | 707/705 |
| 7,937,453 B1 | 5/2011 | Hayden et al. | |
| 8,180,813 B1 | 5/2012 | Goodson et al. | |
| 8,484,259 B1 | 7/2013 | Makkar et al. | |
| 2002/0128995 A1 | 9/2002 | Muntz et al. | |
| 2003/0046335 A1 | 3/2003 | Doyle et al. | |
| 2003/0145086 A1 | 7/2003 | O'Reilly | |
| 2003/0161499 A1 | 8/2003 | Svendsen et al. | |
| 2004/0267830 A1 * | 12/2004 | Wong et al. | 707/200 |
| 2005/0172010 A1 | 8/2005 | Malone et al. | |

(Continued)

OTHER PUBLICATIONS

".NET Programming: A Practical Guide Using C#", By: Pradeep Tapadiya, Publisher: Prentice Hall, Publication Date: Jul. 11, 2002, ISBN: 0-13-066945-8.*

(Continued)

*Primary Examiner* — Jay Morrison
(74) *Attorney, Agent, or Firm* — Gilliam IP PLLC

(57) ABSTRACT

A distributed object store in a network storage system uses location-independent global object identifiers (IDs) for stored data objects. The global object ID enables a data object to be seamlessly moved from one location to another without affecting clients of the storage system, i.e., "transparent migration". The global object ID can be part of a multilevel object handle, which also can include a location ID indicating the specific location at which the data object is stored, and a policy ID identifying a set of data management policies associated with the data object. The policy ID may be associated with the data object by a client of the storage system, for example when the client creates the object, thus allowing "inline" policy management. An object location subsystem (OLS) can be used to locate an object when a client request does not contain a valid location ID for the object.

27 Claims, 11 Drawing Sheets

(56) References Cited

U.S. PATENT DOCUMENTS

| | | | |
|---|---|---|---|
| 2005/0289193 A1 | 12/2005 | Arrouye et al. | |
| 2006/0018506 A1 | 1/2006 | Rodriguez et al. | |
| 2006/0179037 A1* | 8/2006 | Turner et al. | 707/3 |
| 2006/0271598 A1 | 11/2006 | Wong et al. | |
| 2006/0282630 A1* | 12/2006 | Hochberg et al. | 707/203 |
| 2007/0022087 A1* | 1/2007 | Bahar et al. | 707/1 |
| 2007/0043715 A1* | 2/2007 | Kaushik et al. | 707/4 |
| 2007/0055689 A1 | 3/2007 | Rhoads et al. | |
| 2007/0136391 A1 | 6/2007 | Anzai et al. | |
| 2007/0239655 A1* | 10/2007 | Agetsuma et al. | 707/1 |
| 2008/0046538 A1 | 2/2008 | Susarla et al. | |
| 2008/0208917 A1 | 8/2008 | Smoot et al. | |
| 2008/0270684 A1* | 10/2008 | Urmston et al. | 711/108 |
| 2009/0030957 A1 | 1/2009 | Manjunath | |
| 2012/0185646 A1 | 7/2012 | Ikawa et al. | |
| 2012/0290641 A1 | 11/2012 | Enko et al. | |

OTHER PUBLICATIONS

Co-pending U.S. Appl. No. 12/633,718, filed Dec. 8, 2009.
Co-pending U.S. Appl. No. 12/698,019, filed Feb. 1, 2010.
Co-pending U.S. Appl. No. 12/853,191, filed Aug. 9, 2010.
International Search Report PCT/US2010/059566 Mailed Aug. 2, 2011, pp. 1-3.
Written Opinion PCT/US2010/059666 Mailed Aug. 2, 2011, pp. 1-4.
Non-Final Office Action Mailed Nov. 21, 2011 in Co-Pending U.S. Appl. No. 12/633,718 of Goodson, G., et al., filed Dec. 8, 2009.
Notice of Allowance Mailed Mar. 19, 2012 in Co-Pending U.S. Appl. No. 12/633,718 of Goodson, G., et al., filed Dec. 8, 2009.
Non-Final Office Action Mailed May 2, 2012 in Co-Pending U.S. Appl. No. 12/698,019 of Srinivasan, S., et al., filed Feb. 1, 2010.
Anderson, et al., "Global namespace for files", 2004, Ibm Systems Journal, pp. 702-721.
Non-Final Office Action Mailed Sep. 6, 2012 in Co-Pening U.S. Appl. No. 12/853,191 of Makkar, G., et al., filed Aug. 9, 2010.
Final Office Action Mailed Jun. 4, 2013 in Co-Pending U.S. Appl. No. 12/698,019 of Srinivasan, S., et al., filed Feb. 1, 2010.
Notice of Allowance Mailed Mar. 12, 2013 in Co-Pending U.S. Appl. No. 12/853,191 of Gaurav Makkar., et al., filed Aug. 9, 2010.
Non-Final Office Action Mailed Jan. 22, 2013 in Co-Pending U.S. Appl. No. 12/698,019 of Srinivasan, S., et al., filed Feb. 1, 2010.
Final Office Action Mailed Sep. 24, 2012 in Co-Pending U.S. Appl. No. 12/698,019 of Srinivasan, S., et al., filed Feb. 1, 2010.

* cited by examiner

DISTRIBUTED OBJECT STORE FOR NETWORK-BASED CONTENT REPOSITORY

FIELD OF THE INVENTION

At least one embodiment of the present invention pertains to network storage systems, and more particularly, to a distributed object store of a content repository in a network storage server system.

BACKGROUND

Network based storage, or simply "network storage", is a common approach to backing up data, making large amounts of data accessible to multiple users, and other purposes. In a network storage environment, a storage server makes data available to client (host) systems by presenting or exporting to the clients one or more logical containers of data. There are various forms of network storage, including network attached storage (NAS) and storage area network (SAN). In a NAS context, a storage server services file-level requests from clients, whereas in a SAN context a storage server services block-level requests. Some storage servers are capable of servicing both file-level requests and block-level requests.

There are several trends that are relevant to network storage technology. The first is that the amount of data being stored within a typical enterprise is approximately doubling from year to year. Second, there are now multiple classes of storage devices available on the market today, each with its own performance characteristics. These two trends together have caused users to want storage systems that mix different kinds of storage in such a way that it is possible to seamlessly move data across storage tiers based on some policy or policies.

In addition, users often would like to apply policies to collections of data objects. For example, an online social networking site/service might want to replicate all of its original size photos (e.g., photos of its members/users) three times, but not the thumbnail versions, since the thumbnails can be recreated from the originals. Yet today, setting policy within a storage system is a cumbersome process that has to be done out-of-band by a system administrator. Application writers and users cannot specify policies on groups of files/objects.

A problem associated with conventional storage systems is that the use of path names, such as in a traditional filesystem, imposes a hierarchical organization on the data, to which applications need to conform and use for different purposes, such as navigation and retrieval, access control, and data management. However, a hierarchical organization may not make sense for uses other than navigation and retrieval, and as a result, it can lead to inefficiencies such as duplication of content and consequent administrative overhead.

Furthermore, a hierarchical organization has also proven to be ineffective for navigation and retrieval. Consider a photo that is stored under a given path name, such as "/home/eng/myname/office.jpeg". In a traditional storage system, this name maps to a specific server/controller, a specific volume and a specific file location (e.g., inode number) within that volume. Thus, path names are tied to storage location.

SUMMARY

The techniques introduced here provide a distributed object store in a network storage server system. The distributed object store can be part of a content repository, which aside from the distributed object store includes a presentation layer, a metadata subsystem, and a policy-based management subsystem. The content repository can be implemented in a multi-node storage server cluster.

The distributed object store creates and uses system-generated, location-independent (location-transparent), global object identifiers (IDs) for sub-volume level data objects (e.g., files) managed by the storage system. A "data object" can be any unit of data, such as a file, a block of data, or a logical unit ("LUN"). A "sub-volume level" data object is a data object that can be stored within a volume (defined below). The global object ID described herein enables the corresponding data object to be seamlessly moved from one location to another (e.g., from one physical or logical storage container to another) without affecting clients of the storage system; this capability can be called "transparent migration".

The global object ID can be part of a multilevel object handle, which also includes (in addition to the global object ID) a location identifier that indicates the specific location at which the data object is stored. The multilevel object handle can also include other information, such as a policy ID that identifies a set of one or more data management policies associated with the data object. The policy ID may be associated with the data object by a client of the storage system, for example at the time the client creates the data object. Embedding policy information within the object handle allows policy management to be implemented efficiently within the input/output (I/O) path of the server system, i.e., "inline" policy management. For example, in response to receiving from a client a request that includes the object handle, the server system uses the policy ID in the object handle to look up in a database the particular policy or policies associated with that policy ID, and then applies such policy or policies to the request and/or to the data object.

When a client submits a data access request that includes a valid location ID (i.e., within an object handle), the server system can often use that location ID to directly locate and access the target data object. However, in some instances the location ID in the object handle may be invalid, such as if the target data object has been moved, or if the client did not provide a complete object handle. For use in such instances, the server system also includes an object location subsystem (OLS) to locate the target data object. The OLS includes a data structure that maps global object IDs to corresponding valid (up-to-date) location IDs of data objects. The server system further maintains a namespace which is independent of the OLS mapping structure and which includes a mapping of path names to global object IDs of the data objects stored in the server system. A "namespace", as the term is used herein, is a mechanism for allowing end users or applications to name and organize data objects (which may, for example, provide hierarchical naming and/or organization of data, such as a directory/file structure). The namespace together with the OLS provides a layer of indirection between (i.e., provides a logical separation of) path names and storage locations of the stored data objects. This separation facilitates transparent migration (i.e., an object can be moved without affecting its name), and moreover, it enables any particular data object to be represented by multiple paths names, thereby facilitating navigation. In particular, this allows the implementation of a hierarchical protocol such as NFS or CIFS on top of an object store, while at the same time maintaining the ability to do transparent migration.

Other aspects of the technique will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

System Environment

Figure 1:
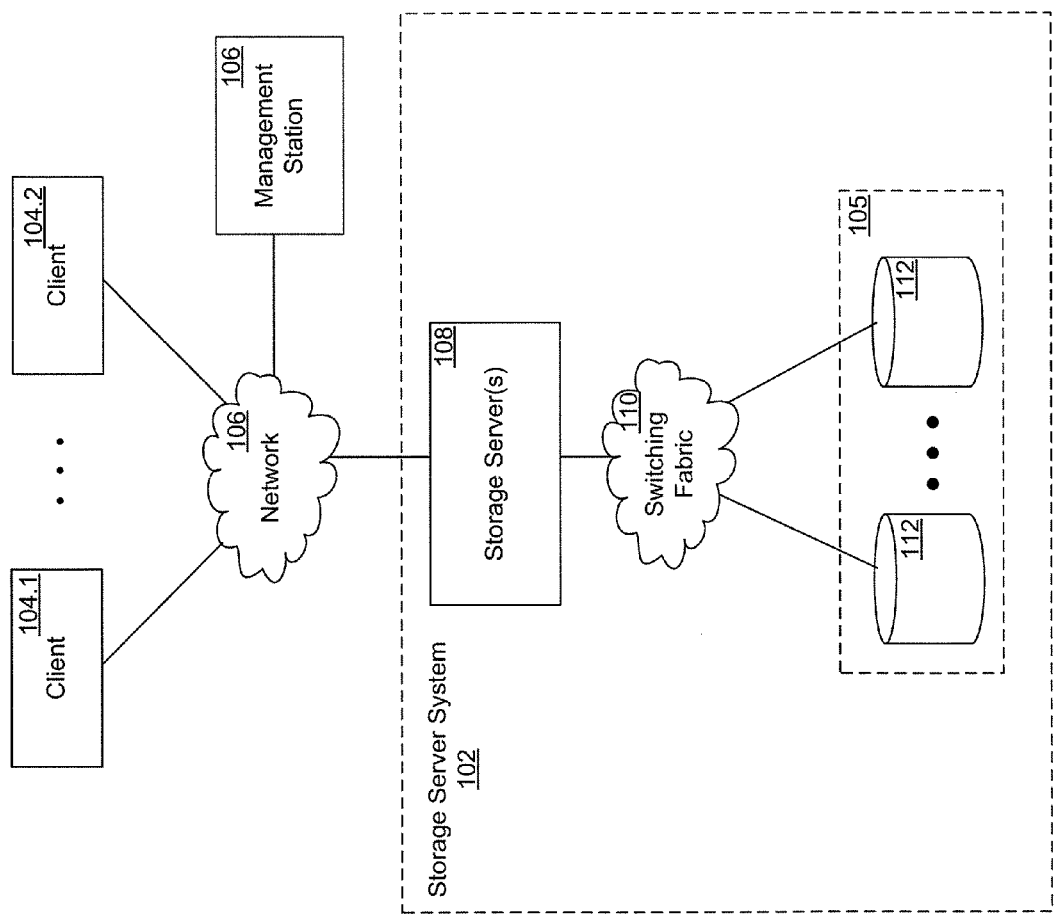
FIG. 1 illustrates a network storage environment in which the present invention can be implemented.
Figure 2:
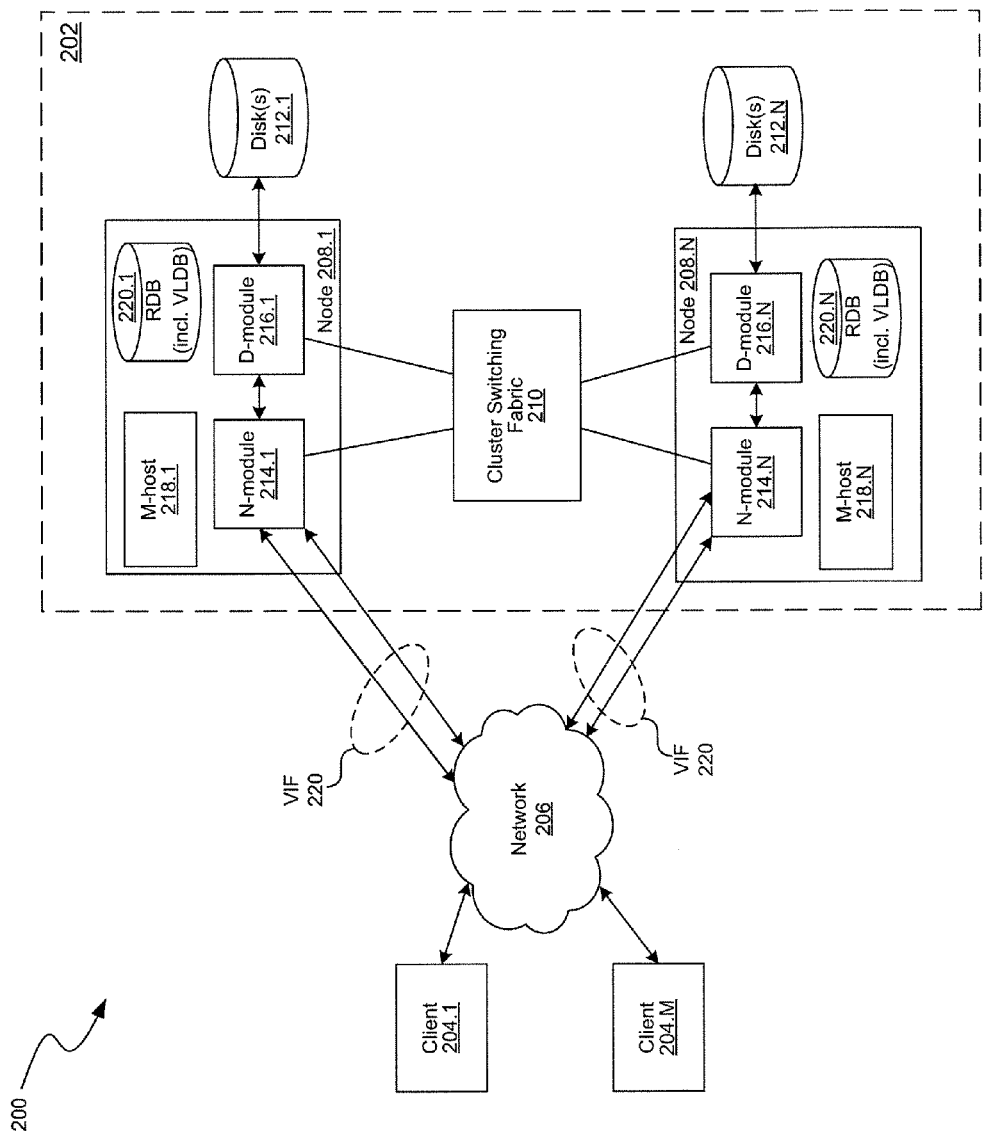
FIG. 2 illustrates a clustered network storage environment in which the present invention can be implemented.

FIGS. 1 and 2 show, at different levels of detail, a network configuration in which the techniques introduced here can be implemented. In particular, FIG. 1 shows a network data storage environment, which includes a plurality of client systems 104.1-104.2, a storage server system 102, and computer network 106 connecting the client systems 104.1-104.2 and the storage server system 102. As shown in FIG. 1, the storage server system 102 includes at least one storage server 108, a switching fabric 110, and a number of mass storage devices 112, such as disks, in a mass storage subsystem 105. Alternatively, some or all of the mass storage devices 212 can be other types of storage, such as flash memory, solid-state drives (SSDs), tape storage, etc.

The storage server (or servers) 108 may be, for example, one of the FAS-xxx family of storage server products available from NetApp, Inc. The client systems 104.1-104.2 are connected to the storage server 108 via the computer network 106, which can be a packet-switched network, for example, a local area network (LAN) or wide area network (WAN). Further, the storage server 108 is connected to the disks 112 via a switching fabric 110, which can be a fiber distributed data interface (FDDI) network, for example. It is noted that, within the network data storage environment, any other suitable numbers of storage servers and/or mass storage devices, and/or any other suitable network technologies, may be employed.

The storage server 108 can make some or all of the storage space on the disk(s) 112 available to the client systems 104.1-104.2 in a conventional manner. For example, each of the disks 112 can be implemented as an individual disk, multiple disks (e.g., a RAID group) or any other suitable mass storage device(s). The storage server 108 can communicate with the client systems 104.1-104.2 according to well-known protocols, such as the Network File System (NFS) protocol or the Common Internet File System (CIFS) protocol, to make data stored on the disks 112 available to users and/or application programs. The storage server 108 can present or export data stored on the disk 112 as volumes to each of the client systems 104.1-104.2. A "volume" is an abstraction of physical storage, combining one or more physical mass storage devices (e.g., disks) or parts thereof into a single logical storage object (the volume), and which is managed as a single administrative unit, such as a single file system. A "file system" is a structured (e.g., hierarchical) set of stored logical containers of data (e.g., volumes, logical unit numbers (LUNs), directories, files). Note that a "file system" does not have to include or be based on "files" per se as its units of data storage.

Various functions and configuration settings of the storage server 108 and the mass storage subsystem 105 can be controlled from a management station 106 coupled to the network 106. Among many other operations, a data object migration operation can be initiated from the management station 106.

FIG. 2 depicts a network data storage environment, which can represent a more detailed view of the environment in FIG. 1. The environment 200 includes a plurality of client systems 204 (204.1-204.M), a clustered storage server system 202, and a computer network 206 connecting the client systems 204 and the clustered storage server system 202. As shown in FIG. 2, the clustered storage server system 202 includes a plurality of server nodes 208 (208.1-208.N), a cluster switching fabric 210, and a plurality of mass storage devices 212 (212.1-212.N), which can be disks, as henceforth assumed here to facilitate description. Alternatively, some or all of the mass storage devices 212 can be other types of storage, such as flash memory, SSDs, tape storage, etc. Note that more than one mass storage device 212 can be associated with each node 208.

Each of the nodes 208 is configured to include several modules, including an N-module 214, a D-module 216, and an M-host 218 (each of which can be implemented by using a separate software module) and an instance of a replicated database (RDB) 220. Specifically, node 208.1 includes an N-module 214.1, a D-module 216.1, and an M-host 218.1; node 208.N includes an N-module 214.N, a D-module 216.N, and an M-host 218.N; and so forth. The N-modules 214.1-214.M include functionality that enables nodes 208.1-208.N, respectively, to connect to one or more of the client systems 204 over the network 206, while the D-modules 216.1-216.N provide access to the data stored on the disks 212.1-212.N, respectively. The M-hosts 218 provide management functions for the clustered storage server system 202. Accordingly, each of the server nodes 208 in the clustered storage server arrangement provides the functionality of a storage server.

The RDB 220 is a database that is replicated throughout the cluster, i.e., each node 208 includes an instance of the RDB 220. The various instances of the RDB 220 are updated regularly to bring them into synchronization with each other. The RDB 220 provides cluster-wide storage of various information used by all of the nodes 208, including a volume location database (VLDB) (not shown). The VLDB is a database that indicates the location within the cluster of each volume in the cluster (i.e., the owning D-module 216 for each volume) and is used by the N-modules 214 to identify the appropriate D-module 216 for any given volume to which access is requested.

The nodes 208 are interconnected by a cluster switching fabric 210, which can be embodied as a Gigabit Ethernet switch, for example. The N-modules 214 and D-modules 216 cooperate to provide a highly-scalable, distributed storage system architecture of a clustered computing environment implementing exemplary embodiments of the present invention. Note that while there is shown an equal number of N-modules and D-modules in FIG. 2, there may be differing numbers of N-modules and/or D-modules in accordance with various embodiments of the technique described here. For example, there need not be a one-to-one correspondence between the N-modules and D-modules. As such, the description of a node 208 comprising one N-module and one D-module should be understood to be illustrative only.

Figure 3:
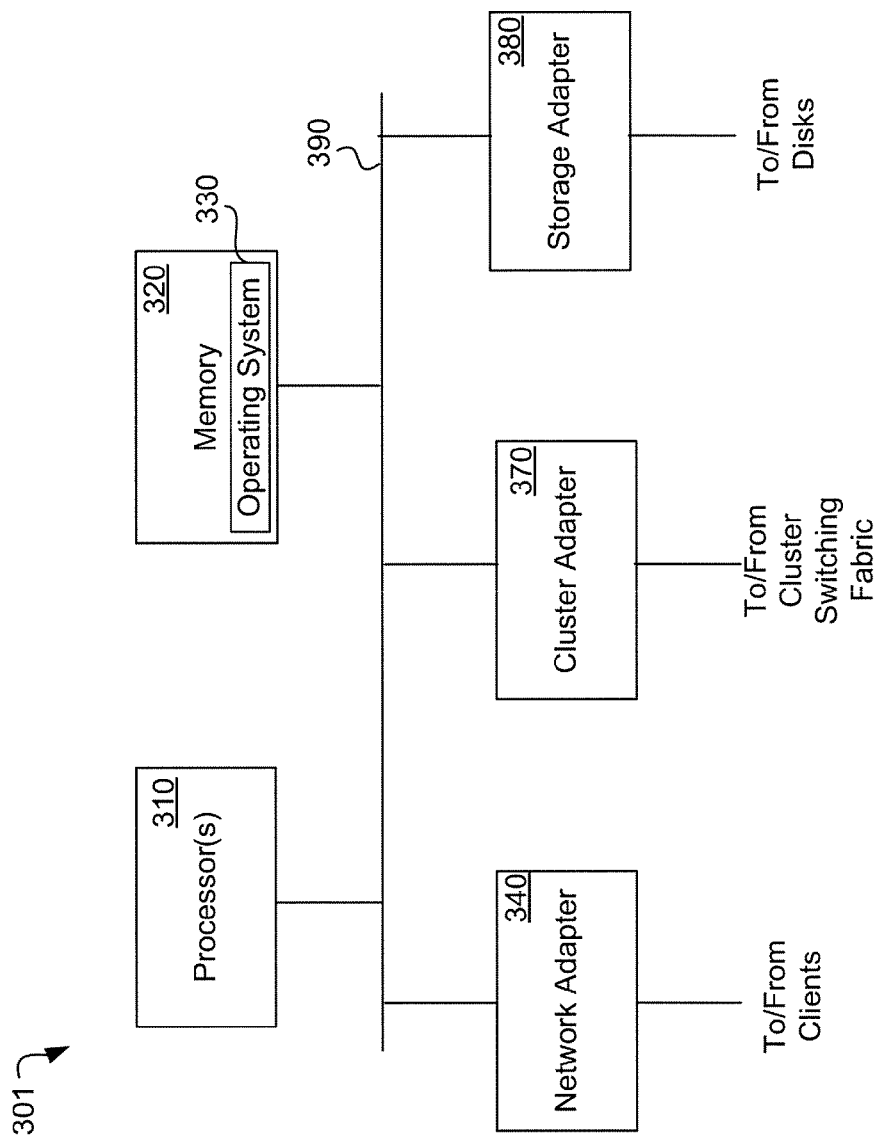
FIG. 3 is a high-level block diagram showing an example of the hardware architecture of a storage controller that can implement one or more storage server nodes.

FIG. 3 is a diagram illustrating an example of a storage controller that can implement one or more of the storage server nodes 208. In an exemplary embodiment, the storage controller 301 includes a processor subsystem that includes one or more processors. The storage controller 301 further includes a memory 320, a network adapter 340, a cluster access adapter 370 and a storage adapter 380, all interconnected by an interconnect 390. The cluster access adapter 370 includes a plurality of ports adapted to couple the node 208 to other nodes 208 of the cluster. In the illustrated embodiment, Ethernet is used as the clustering protocol and interconnect media, although other types of protocols and interconnects may be utilized within the cluster architecture described herein. In alternative embodiments where the N-modules and D-modules are implemented on separate storage systems or computers, the cluster access adapter 270 is utilized by the N-module 214 and/or D-module 216 for communicating with other N-modules and/or D-modules of the cluster.

The storage controller 301 can be embodied as a single- or multi-processor storage system executing a storage operating system 330 that preferably implements a high-level module, such as a storage manager, to logically organize the information as a hierarchical structure of named directories, files and special types of files called virtual disks (hereinafter generally "blocks") on the disks. Illustratively, one processor 310 can execute the functions of the N-module 214 on the node 208 while another processor 310 executes the functions of the D-module 216.

The memory 320 illustratively comprises storage locations that are addressable by the processors and adapters 340, 370, 380 for storing software program code and data structures associated with the present invention. The processor 310 and adapters may, in turn, comprise processing elements and/or logic circuitry configured to execute the software code and manipulate the data structures. The storage operating system 330, portions of which is typically resident in memory and executed by the processors(s) 310, functionally organizes the storage controller 301 by (among other things) configuring the processor(s) 310 to invoke storage operations in support of the storage service provided by the node 208. It will be apparent to those skilled in the art that other processing and memory implementations, including various computer readable storage media, may be used for storing and executing program instructions pertaining to the technique introduced here.

The network adapter 340 includes a plurality of ports to couple the storage controller 301 to one or more clients 204 over point-to-point links, wide area networks, virtual private networks implemented over a public network (Internet) or a shared local area network. The network adapter 340 thus can include the mechanical, electrical and signaling circuitry needed to connect the storage controller 301 to the network 206. Illustratively, the network 206 can be embodied as an Ethernet network or a Fibre Channel (FC) network. Each client 204 can communicate with the node 208 over the network 206 by exchanging discrete frames or packets of data according to pre-defined protocols, such as TCP/IP.

The storage adapter 380 cooperates with the storage operating system 330 to access information requested by the clients 204. The information may be stored on any type of attached array of writable storage media, such as magnetic disk or tape, optical disk (e.g., CD-ROM or DVD), flash memory, solid-state disk (SSD), electronic random access memory (RAM), micro-electro mechanical and/or any other similar media adapted to store information, including data and parity information. However, as illustratively described herein, the information is stored on disks 212. The storage adapter 380 includes a plurality of ports having input/output (I/O) interface circuitry that couples to the disks over an I/O interconnect arrangement, such as a conventional high-performance, Fibre Channel (FC) link topology.

Storage of information on disks 212 can be implemented as one or more storage volumes that include a collection of physical storage disks cooperating to define an overall logical arrangement of volume block number (VBN) space on the volume(s). The disks 212 can be organized as a RAID group. One or more RAID groups together form an aggregate. An aggregate can contain one or more volumes/file systems.

The storage operating system 330 facilitates clients' access to data stored on the disks 212. In certain embodiments, the storage operating system 330 implements a write-anywhere file system that cooperates with one or more virtualization modules to "virtualize" the storage space provided by disks 212. In certain embodiments, a storage manager 460 (FIG. 4) logically organizes the information as a hierarchical structure of named directories and files on the disks 212. Each "on-disk" file may be implemented as set of disk blocks configured to store information, such as data, whereas the directory may be implemented as a specially formatted file in which names and links to other files and directories are stored. The virtualization module(s) allow the storage manager 460 to further logically organize information as a hierarchical structure of blocks on the disks that are exported as named logical unit numbers (LUNs).

In the illustrative embodiment, the storage operating system 330 is a version of the Data ONTAP® operating system available from NetApp, Inc. and the storage manager 460 implements the Write Anywhere File Layout (WAFL®) file system. However, other storage operating systems are capable of being enhanced or created for use in accordance with the principles described herein.

Figure 4:
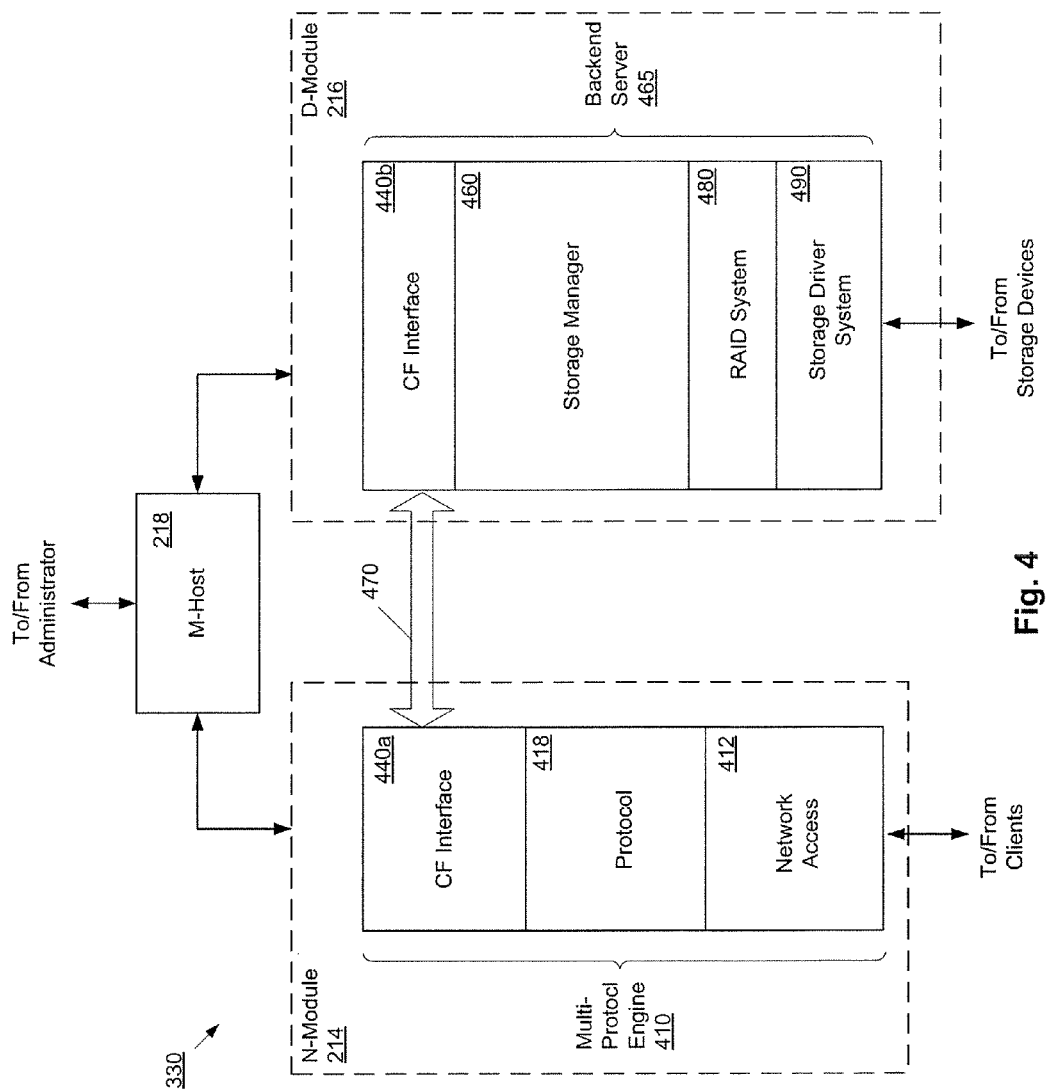
FIG. 4 illustrates an example of a storage operating system of a storage server node.

FIG. 4 is a diagram illustrating an example of storage operating system 330 that can be used with the technique introduced here. In the illustrated embodiment the storage operating system 330 includes multiple functional layers organized to form an integrated network protocol stack or, more generally, a multi-protocol engine 410 that provides data paths for clients to access information stored on the node using block and file access protocols. The multiprotocol engine 410 in combination with underlying processing hardware also forms the N-module 214. The multi-protocol engine 410 includes a network access layer 412 which includes one or more network drivers that implement one or more lower-level protocols to enable the processing system to communicate over the network 206, such as Ethernet, Internet Protocol (IP), Transport Control Protocol/Internet Protocol (TCP/IP), Fibre Channel Protocol (FCP) and/or User Datagram Protocol/Internet Protocol (UDP/IP). The multiprotocol engine 410 also includes a protocol layer which implements various higher-level network protocols, such as Network File System (NFS), Common Internet File System (CIFS), Hypertext Transfer Protocol (HTTP), Internet small computer system interface (iSCSI), etc. Further, the multiprotocol engine 410 includes a cluster fabric (CF) interface module 440a which implements intra-cluster communication with D-modules and with other N-modules.

In addition, the storage operating system 330 includes a set of layers organized to form a backend server 465 that provides data paths for accessing information stored on the disks 212 of the node 208. The backend server 465 in combination with underlying processing hardware also forms the D-module 216. To that end, the backend server 465 includes a storage manager module 460 that manages any number of volumes 472, a RAID system module 480 and a storage driver system module 490.

The storage manager 460 primarily manages a file system (or multiple file systems) and serves client-initiated read and write requests. The RAID system 480 manages the storage and retrieval of information to and from the volumes/disks in accordance with a RAID redundancy protocol, such as RAID-4, RAID-5, or RAID-DP, while the disk driver system 490 implements a disk access protocol such as SCSI protocol or FCP.

The backend server 465 also includes a CF interface module 440b to implement intra-cluster communication 470 with N-modules and/or other D-modules. The CF interface modules 440a and 440b can cooperate to provide a single file system image across all D-modules 216 in the cluster. Thus, any network port of an N-module 214 that receives a client request can access any data container within the single file system image located on any D-module 216 of the cluster.

The CF interface modules 440 implement the CF protocol to communicate file system commands among the modules of cluster over the cluster switching fabric 210 (FIG. 2). Such communication can be effected by a D-module exposing a CF application programming interface (API) to which an N-module (or another D-module) issues calls. To that end, a CF interface module 440 can be organized as a CF encoder/decoder. The CF encoder of, e.g., CF interface 440a on N-module 214 can encapsulate a CF message as (i) a local procedure call (LPC) when communicating a file system command to a D-module 216 residing on the same node or (ii) a remote procedure call (RPC) when communicating the command to a D-module residing on a remote node of the cluster. In either case, the CF decoder of CF interface 440b on D-module 216 de-encapsulates the CF message and processes the file system command.

In operation of a node 208, a request from a client 204 is forwarded as a packet over the network 206 and onto the node 208, where it is received at the network adapter 340 (FIG. 3). A network driver of layer 412 processes the packet and, if appropriate, passes it on to a network protocol and file access layer for additional processing prior to forwarding to the storage manager 460. At that point, the storage manager 460 generates operations to load (retrieve) the requested data from disk 212 if it is not resident in memory 320. If the information is not in memory 320, the storage manager 460 indexes into a metadata file to access an appropriate entry and retrieve a logical VBN. The storage manager 460 then passes a message structure including the logical VBN to the RAID system 480; the logical VBN is mapped to a disk identifier and disk block number (DBN) and sent to an appropriate driver (e.g., SCSI) of the disk driver system 490. The disk driver accesses the DBN from the specified disk 212 and loads the requested data block(s) in memory for processing by the node. Upon completion of the request, the node (and operating system) returns a reply to the client 204 over the network 206.

The data request/response "path" through the storage operating system 330 as described above can be implemented in general-purpose programmable hardware executing the storage operating system 330 as software or firmware. Alternatively, it can be implemented at least partially in specially designed hardware. That is, in an alternate embodiment of the invention, some or all of the storage operating system 330 is implemented as logic circuitry embodied within a field programmable gate array (FPGA) or an application specific integrated circuit (ASIC), for example.

The N-module 214 and D-module 216 each can be implemented as processing hardware configured by separately-scheduled processes of storage operating system 330; however, in an alternate embodiment, the modules may be implemented as processing hardware configured by code within a single operating system process. Communication between an N-module 214 and a D-module 216 is thus illustratively effected through the use of message passing between the modules although, in the case of remote communication between an N-module and D-module of different nodes, such message passing occurs over the cluster switching fabric 210. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF API.

Overview of Content Repository

Figure 5:
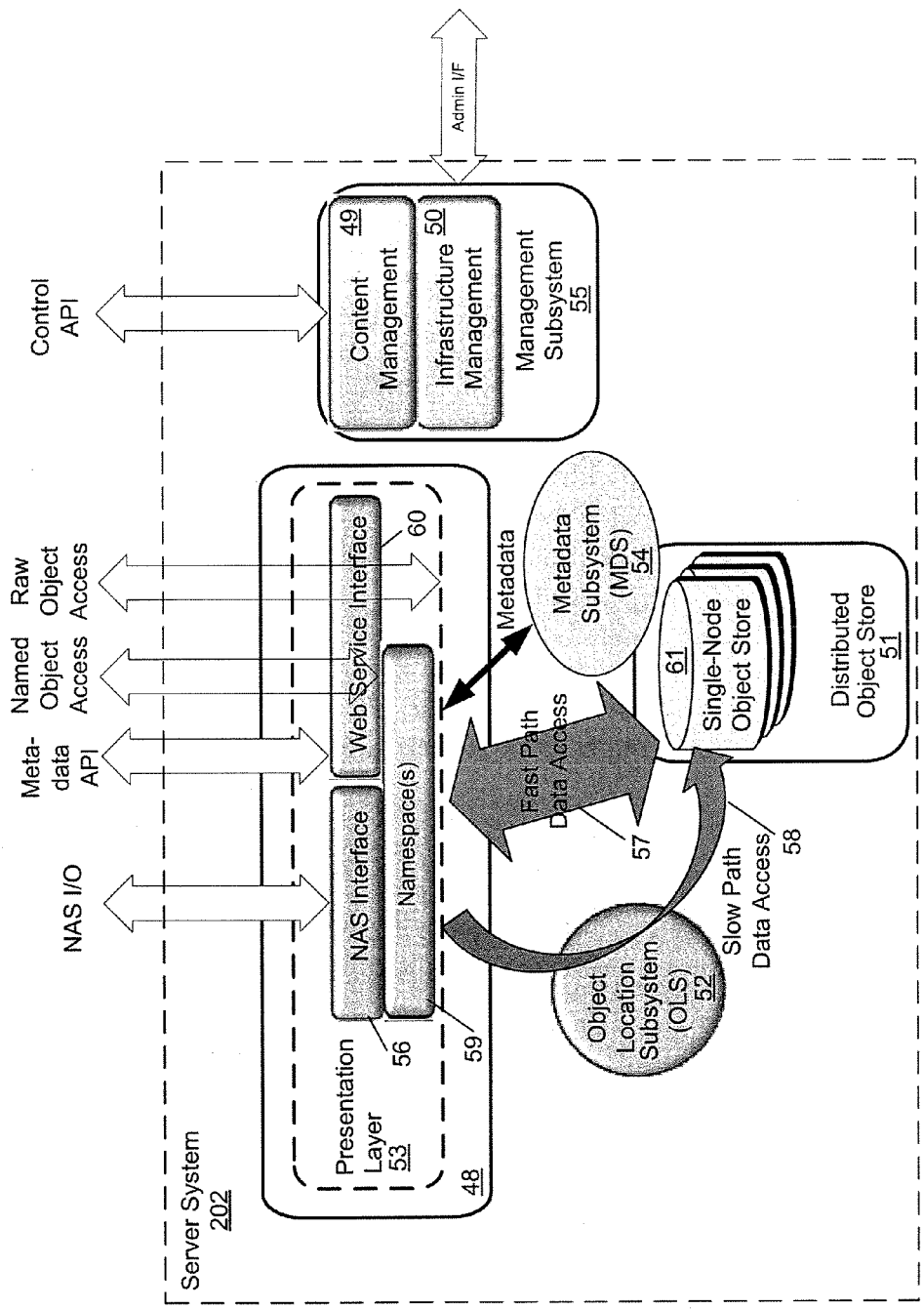
FIG. 5 illustrates the overall architecture of a content repository according to one embodiment.

The techniques introduced here generally relate to a content repository implemented in a network storage server system 202 such as described above. FIG. 5 illustrates the overall architecture of the content repository according to one embodiment. The major components of the content repository include a distributed object store 51, and object location subsystem (OLS) 52, a presentation layer 53, a metadata subsystem (MDS) 54 and a management subsystem 55. Normally there will be a single instance of each of these components in the overall content repository, and each of these components can be implemented in any one server node 208 or distributed across two or more server nodes 208. The functional elements of each of these units (i.e., the OLS 52, presentation layer 53, MDS 54 and management subsystem 55) can be implemented by specially designed circuitry, or by programmable circuitry programmed with software and/or firmware, or a combination thereof. The data storage elements of these units can be implemented using any known or convenient form or forms of data storage device.

The distributed object store 51 provides the actual data storage for all data objects in the server system 202 and includes multiple distinct single-node object stores 61. A "single-node" object store is an object store that is implemented entirely within one node. Each single-node object store 61 is a logical (non-physical) container of data, such as a volume or a logical unit (LUN). Some or all of the single-node object stores 61 that make up the distributed object store 51 can be implemented in separate server nodes 208. Alternatively, all of the single-node object stores 61 that make up the distributed object store 51 can be implemented in the same server node. Any given server node 208 can access multiple single-node object stores 61 and can include multiple single-node object stores 61.

The distributed object store provides location-independent addressing of data objects (i.e., data objects can be moved among single-node object stores 61 without changing the data objects' addressing), with the ability to span the object address space across other similar systems spread over geographic distances. Note that the distributed object store 51 has no namespace; the namespace for the server system 202 is provided by the presentation layer 53.

The presentation layer 53 provides access to the distributed object store 51. It is generated by at least one presentation module 48 (i.e., it may be generated collectively by multiple presentation modules 48, one in each multiple server nodes 208). A presentation module 48 can be in the form of specially designed circuitry, or programmable circuitry programmed with software and/or firmware, or a combination thereof.

The presentation layer 53 essentially functions as a router, by receiving client requests, translating them into an internal protocol and sending them to the appropriate D-module 216. The presentation layer 53 provides two or more independent interfaces for accessing stored data, e.g., a conventional NAS interface 56 and a Web Service interface 60. The NAS interface 56 allows access to the object store 51 via one or more conventional NAS protocols, such as NFS and/or CIFS. Thus, the NAS interface 56 provides a filesystem-like interface to the content repository.

The Web Service interface 60 allows access to data stored in the object store 51 via either "named object access" or "raw object access" (also called "flat object access"). Named object access uses a namespace (e.g., a filesystem-like directory-tree interface for accessing data objects), as does NAS access; whereas raw object access uses system-generated global object IDs to access data objects, as described further below. The Web Service interface 60 allows access to the object store 51 via Web Service (as defined by the W3C), using for example, a protocol such as Simple Object Access Protocol (SOAP) or a RESTful (REpresentational State Transfer-ful) protocol, over HTTP.

The presentation layer 53 further provides at least one namespace 59 for accessing data via the NAS interface or the Web Service interface. In one embodiment this includes a Portable Operating System Interface (POSIX) namespace. The NAS interface 56 allows access to data stored in the object store 51 via the namespace(s) 59. The Web Service interface 60 allows access to data stored in the object store 51 via either the namespace(s) 59 (by using named object access) or without using the namespace(s) 59 (by using "raw object access"). Thus, the Web Service interface 60 allows either named object access or raw object access; and while named object access is accomplished using a namespace 59, raw object access is not. Access by the presentation layer 53 to the object store 51 is via either a "fast path" 57 or a "slow path" 58, as discussed further below.

The function of the OLS 52 is to store and provide valid location IDs (and other information, such as policy IDs) of data objects, based on their global object IDs (these parameters are discussed further below). This is done, for example, when a client 204 requests access to a data object by using only the global object ID instead of a complete object handle including the location ID, or when the location ID within an object handle is no longer valid (e.g., because the target data object has been moved). Note that the system 202 thereby provides two distinct paths for accessing stored data, namely, a "fast path" 57 and a "slow path" 58. The fast path 57 provides data access when a valid location ID is provided by a client 204 (e.g., within an object handle). The slow path 58 makes use of the OLS and is used in all other instances of data access. The fast path 57 is so named because a target data object can be located directly from its (valid) location ID, whereas the slow path 58 is so named because it requires a number of additional steps (relative to the fast path) to determine the location of the target data object.

The MDS 54 is a subsystem for search and retrieval of stored data objects, based on metadata. It is accessed by users through the presentation layer 53. The MDS 54 stores data object metadata, which can include metadata specified by users, inferred metadata and/or system-defined metadata. The MDS 54 also allows data objects to be identified and retrieved by searching on any of that metadata. The metadata may be distributed across nodes in the system. In one embodiment where this is the case, the metadata for any particular data object are stored in the same node as the object itself.

As an example of user-specified metadata, users of the system can create and associate various types of tags (e.g., key/value pairs) with data objects, based on which such objects can be searched and located. For example, a user can define a tag called "location" for digital photos, where the value of the tag (e.g., a character string) indicates where the photo was taken. Or, digital music files can be assigned a tag called "mood", the value of which indicates the mood evoked by the music. On the other hand, the system can also generate or infer metadata based on the data objects themselves and/or accesses to them.

There are two types of inferred metadata: 1) latent and 2) system-generated. Latent inferred metadata is metadata in a data object which can be extracted automatically from the object and can be tagged on the object (examples include Genre, Album in an MP3 object, or Author, DocState in a Word document). System-generated inferred metadata is metadata generated by the server system 202 and includes working set information (e.g., access order information used for object prefetching), and object relationship information; these metadata are generated by the system to enable better "searching" via metadata queries (e.g., the system can track how many times an object has been accessed in the last week, month, year, and thus, allow a user to run a query, such as "Show me all of the JPEG images I have looked at in the last month"). System-defined metadata includes, for example, typical file attributes such as size, creation time, last modification time, last access time, owner, etc.

The MDS 54 includes logic to allow users to associate a tag-value pair with an object and logic that provides two data object retrieval mechanisms. The first retrieval mechanism involves querying the metadata store for objects matching a user-specified search criterion or criteria, and the second involves accessing the value of a tag that was earlier associated with a specific object. The first retrieval mechanism, called a query, can potentially return multiple object handles, while the second retrieval mechanism, called a lookup, deals with a specific object handle of interest.

The management subsystem 55 includes a content management component 49 and an infrastructure management component 50. The infrastructure management component 50 includes logic to allow an administrative user to manage the storage infrastructure (e.g., configuration of nodes, disks, volumes, LUNs, etc.). The content management component 49 is a policy based data management subsystem for managing the lifecycle of data objects (and optionally the metadata) stored in the content repository, based on user-specified policies or policies derived from user-defined SLOs. It can execute actions to enforce defined policies in response to system-defined trigger events and/or user-defined trigger events (e.g., attempted creation, deletion, access or migration of an object). Trigger events do not have to be based on user actions.

The specified policies may relate to, for example, system performance, data protection and data security. Performance related policies may relate to, for example, which logical container a given data object should be placed in, migrated from or to, when the data object should be migrated or deleted, etc. Data protection policies may relate to, for example, data backup and/or data deletion. Data security policies may relate to, for example, when and how data should be encrypted, who has access to particular data, etc. The specified policies can also include polices for power management, storage efficiency, data retention, and deletion criteria. The policies can be specified in any known, convenient or desirable format and method. A "policy" in this context is not necessarily an explicit specification by a user of where to store what data, when to move data, etc. Rather, a "policy" can be a set of specific rules regarding where to store what, when to migrate data, etc., derived by the system from the end user's SLOs, i.e., a more general specification of the end user's expected performance, data protection, security, etc. For example, an administrative user might simply specify a range of performance that can be tolerated with respect to a particular parameter, and in response the management subsystem 55 would identify the appropriate data objects that need to be migrated, where they should get migrated to, and how quickly they need to be migrated.

The content management component 49 uses the metadata tracked by the MDS 54 to determine which objects to act upon (e.g., move, delete, replicate, encrypt, compress). Such metadata may include user-specified metadata and/or system-generated metadata. The content management component 49 includes logic to allow users to define policies and logic to execute/apply those policies.

Figure 6:
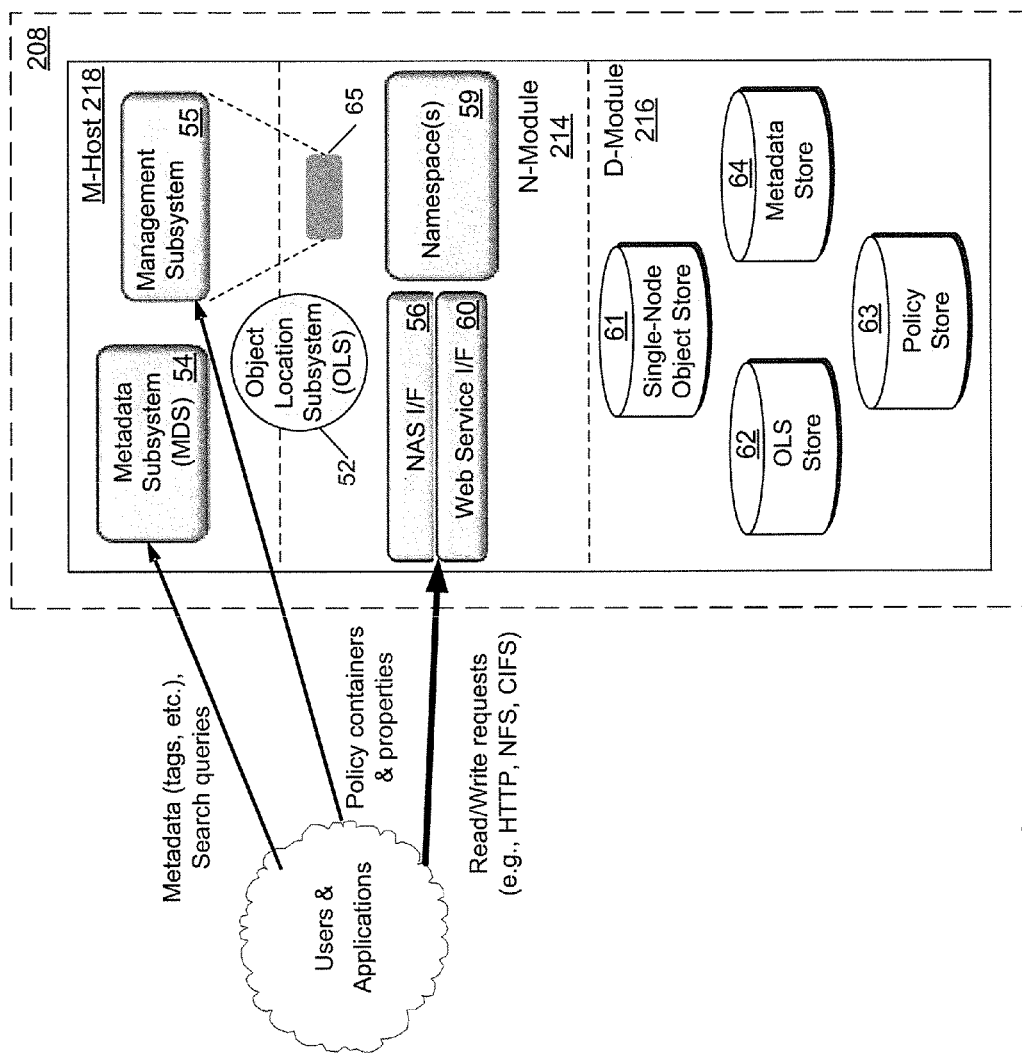
FIG. 6 illustrates how a content repository can be implemented in the clustered architecture of FIGS. 2 through 4.

FIG. 6 illustrates an example of how the content repository can be implemented relative to the clustered architecture in FIGS. 2 through 4. Although FIG. 6 illustrates the system relative to a single server node 208, it will be recognized that the configuration shown on the right side of FIG. 6 actually can be implemented by two or more (or all) of the server nodes 208 in a cluster.

In one embodiment, the distributed object store 51 is implemented by providing at least one single-node object store 61 in each of at least two D-modules 216 in the system (any given D-module 216 can include zero or more single node object stores 61). Also implemented in each of at least two D-modules 216 in the system are: an OLS store 62 that contains mapping data structures used by the OLS 52 including valid location IDs and policy IDs; a policy store 63 (e.g., a database) that contains user-specified policies relating to data objects (note that at least some policies or policy information may also be cached in the N-module 214 to improve performance); and a metadata store 64 that contains metadata used by the MDS 54, including user-specified object tags. In practice, the metadata store 64 may be combined with, or implemented as a part of, the single node object store 61.

The presentation layer 53 is implemented at least partially within each N-module 214. In one embodiment, the OLS 52 is implemented partially by the N-module 214 and partially by the corresponding M-host 218, as illustrated in FIG. 6. More specifically, in one embodiment the functions of the OLS 52 are implemented by a special daemon in the M-host 218 and by the presentation layer 53 in the N-module 214.

In one embodiment, the MDS 54 and management subsystem 55 are both implemented at least partially within each M-host 218. Nonetheless, in some embodiments, any of these subsystems may also be implemented at least partially within other modules. For example, at least a portion of the content management component 49 of the management subsystem 55 can be implemented within one or more N-modules 214 to allow, for example, caching of policies in such N-modules and/or execution/application of policies by such N-module(s). In that case, the processing logic and state information for executing/applying policies may be contained in one or more N-modules 214, while processing logic and state information for managing policies is stored in one or more M-hosts 218. As another example, at least a portion of the MDS 54 may be implemented within one or more D-modules 216, to allow it to access more efficiently system generated metadata generated within those modules.

Administrative users can specify policies for use by the management subsystem 55, via a user interface provided by the M-host 218 to access the management subsystem 55. Further, via a user interface provided by the M-host 218 to access the MDS 54, end users can assign metadata tags to data objects, where such tags can be in the form of key/value pairs. Such tags and other metadata can then be searched by the MDS 54 in response to user-specified queries, to locate or allow specified actions to be performed on data objects that meet user-specified criteria. Search queries received by the MDS 54 are applied by the MDS 54 to the single node object store 61 in the appropriate D-module(s) 216.

Distributed Object Store

Figure 7:
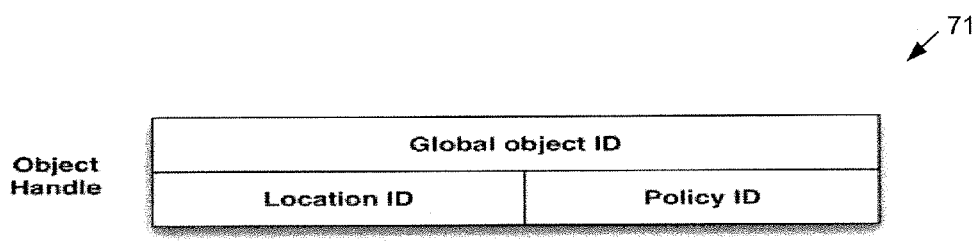
FIG. 7 illustrates a multilevel object handle.

As noted above, the distributed object store enables both path-based access to data objects as well as direct access to data objects. For purposes of direct access, the distributed object store uses a multilevel object handle, as illustrated in FIG. 7. When a client 204 creates a data object, it receives an object handle 71 as the response to creating the object. This is similar to a file handle that is returned when a file is created in a traditional storage system. The first level of the object handle is a system-generated globally unique number, called a global object ID, that is permanently attached to the created data object. The second level of the object handle is a "hint" which includes the location ID of the data object and, in the illustrated embodiment, the policy ID of the data object. Clients 204 can store this object handle 71, containing the global object ID location ID and policy ID.

When a client 204 attempts to read or write the data object using the direct access approach, the client includes the object handle of the object in its read or write request to the server system 202. The server system 202 first attempts to use the location ID (within the object handle), which is intended to be a pointer to the exact location within a volume where the data object is stored. In the common case, this operation succeeds and the object is read/written. This sequence is the "fast path" 57 for I/O (see FIG. 5).

If, however, an object is moved from one location to another (for example, from one volume to another), the server system 202 creates a new location ID for the object. In that case, the old location ID becomes stale (invalid). The client may not be notified that the object has been moved or that the location ID is stale and may not receive the new location ID for the object, at least until the client subsequently attempts to access that data object (e.g., by providing an object handle with an invalid location ID). Or, the client may be notified but may not be able or configured to accept or understand the notification.

The current mapping from global object ID to location ID is always stored reliably in the OLS 52. If, during fast path I/O, the server system 202 discovers that the target data object no longer exists at the location pointed to by the provided location ID, this means that the object must have been either deleted or moved. Therefore, at that point the server system 202 will invoke the OLS 52 to determine the new (valid) location ID for the target object. The server system 202 then uses the new location ID to read/write the target object. At the same time, the server system 202 invalidates the old location ID and returns a new object handle to the client that contains the unchanged and unique global object ID, as well as the new location ID. This process enables clients to transparently adapt to objects that move from one location to another (for example in response to a change in policy).

An enhancement of this technique is for a client 204 never to have to be concerned with refreshing the object handle when the location ID changes. In this case, the server system 202 is responsible for mapping the unchanging global object id to location ID. This can be done efficiently by compactly storing the mapping from global object ID to location ID in, for example, cache memory of one or more N-modules 214.

Figure 8:
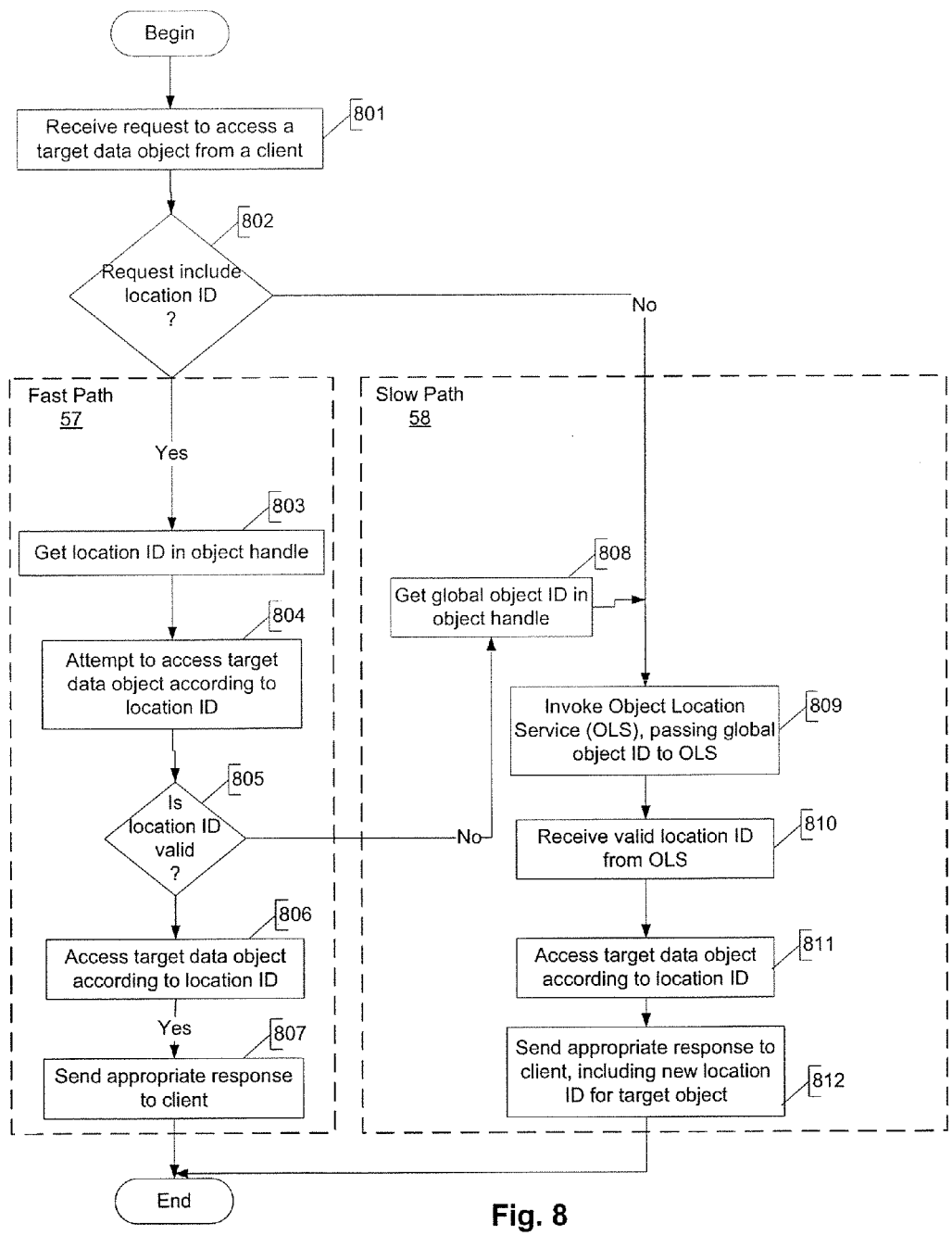
FIG. 8 is a flow diagram showing an example of the overall process by which a distributed object store services a data access request from a client.

Refer now to FIG. 8, which shows an example of the overall process by which the distributed object store services a data access request from a client 204. Initially, at 801 the server system 202 receives from a client 204 a request to access the target data object (e.g., a read or write request). The request at least includes a global object ID for the target data object. The server system 202 then determines at 802 whether the request includes a location ID (as noted above, in some instances a client may provide only the global object ID with the request). If the request includes a location ID, then the process proceeds with the fast path I/O, i.e., to operation 803; otherwise, the process proceeds with the slow path, to operation 808.

At 803 the distributed object store gets the location ID in the provided object handle. Next, at 804 the server system 202 attempts to access the target data object according to that location ID. Part of attempting to access the data object is determining whether the location ID provided in the object handle is valid. In one embodiment this is accomplished by examining a flag in metadata of the target object, where such flag is set whenever the object is deleted or moved. For example, such a flag may exist in an inode representing the target object. If the object has been deleted or moved, the location ID will be invalid.

In this regard, note that the location ID maps to an internal file handle, which includes a number of fields. Once a D-module 216 receives a file handle, it can determine by looking at these fields whether the file handle is recent. The two relevant fields in this regard are the file ID (or inode number) and the generation number. The file ID (or inode number) can be used to determine if an inode for the target data object exists (and so, whether the data object itself exists), and the generation number can be used to determine whether the file handle refers to the correct version of the data object. The file ID (or inode number) maps to the data object's inode, and the generation number is a counter stored within the inode. Whenever the inode is reused (e.g., the previous data object is deleted and a new one is created), the generation number within the inode is incremented. This allows a D-module 216 (and, more specifically, its storage manager 460) to detect access to a valid inode with an invalid generation number. Once this occurs the storage manager 460 in the D-module 216 returns a "Stale file handle" error, which triggers an "Invalid Location ID" error. Thus, the file ID can be used to determine if an inode for the target data object exists (and so, whether the data object itself exists) and the generation number can be used to determine whether the file handle refers to the correct version of the data object. If one of these is not valid, an "Invalid Location ID" error is returned and can be used to trigger access the OLS 52 to get an updated location ID.

Referring still to FIG. 8, if the location ID in the object handle is valid (805), then at 806 the server system 202 accesses the target data object according to that location ID. The server system 202 then sends an appropriate response to the client at 807 (e.g., including the requested data in the case of a read or a confirmation in the case or write), and the process then ends.

If the location ID was not valid (805), then the process branches to the slow path, proceeding to operation 808. At 808 the server system 202 gets the global object ID from the object handle provided by the client. At 809 the server system 202 invokes the OLS 52, passing the global object ID to the OLS 52. The OLS 52 then determines and returns the valid location ID for the target data object at 810, in a manner which is described below. The server system 202 then accesses the target data object at 811 according to the valid location ID, and at 812 the server system 202 sends an appropriate response to the client, including the new (valid) location ID for the target object. The process then ends.

Referring again to 802, if the request from the client did not include a location ID, the system uses the slow path, proceeding to 809 as described above.

As noted above, an object handle can contain a policy ID to support inline policy management (i.e., policy management within the normal I/O path), which allows fast execution of policies. When a data object is created, the create function can also specify the policy or set of policies that needs to be applied on the object. Examples of such a policy (expressed here in natural language for simplicity) include "replicate an object twice", "compress the object after storing it", and "store the object on cheap, low-power disks". One or more such policies can be represented by a policy ID.

Each time during an object read/write or delete, the server system 202 uses the policy ID encoded in the object handle to quickly look up in the policy store the action that needs to be taken. For example, if the policy states "do not delete this file until 2015", a delete operation will fail until after that year. If for some reason a policy ID cannot be specified (as may be the case with certain protocols, such as NFS or CIFS), a default policy or a policy based on the data object's location or type can be applied.

Figure 9:
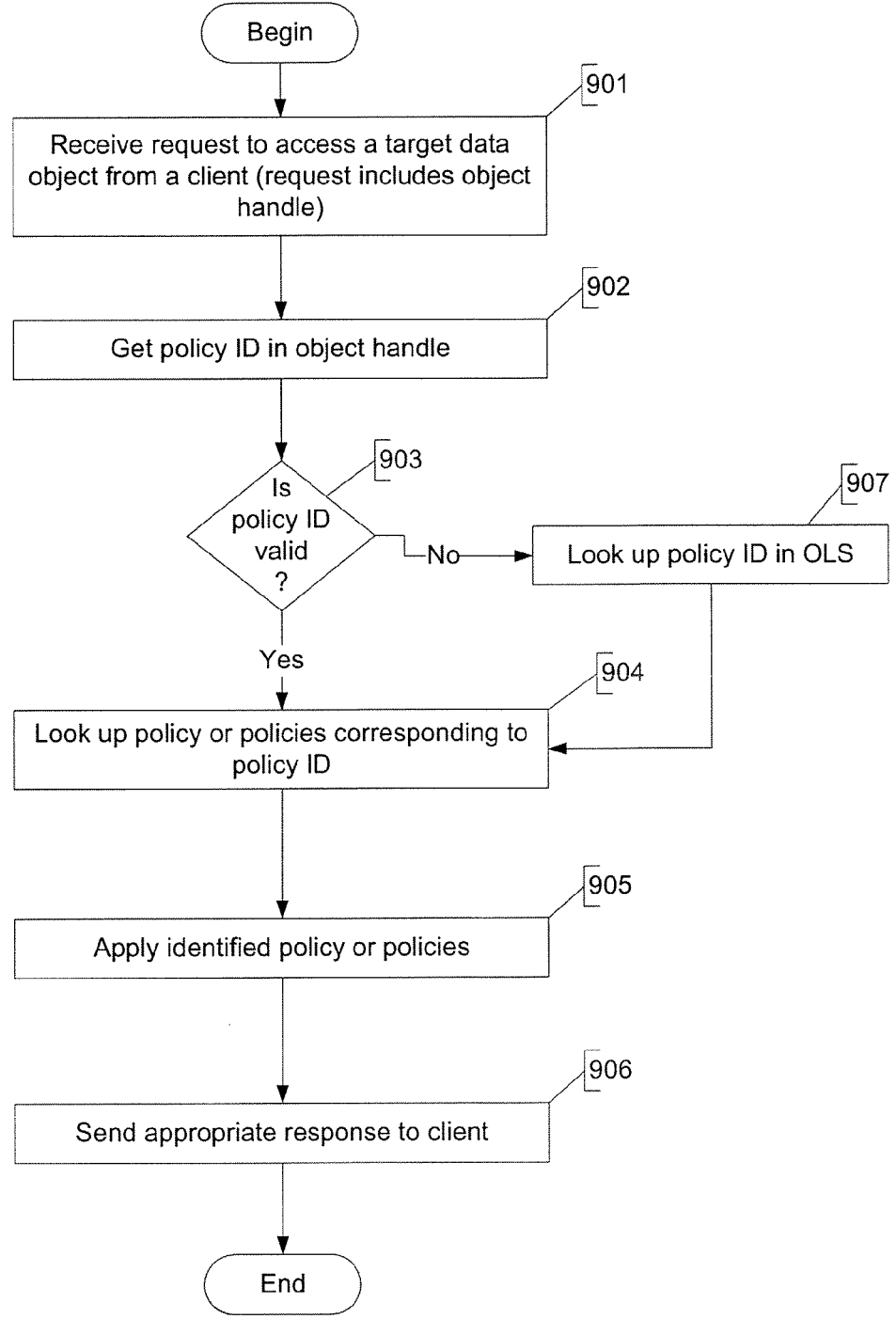
FIG. 9 is a flow diagram showing an example of a process of in-line policy management.

FIG. 9 illustrates an example of the process of in-line policy management. At 901 the server system 202 receives a request from a client 204 to access the target data object (e.g., a read or write request). The request includes an object handle. At 902 the server system 202 responds to the request by getting the policy ID contained within the object handle. At 903 the server system 202 determines whether the policy ID is valid. Whether the policy ID is valid can be determined is essentially the same manner as done for the location ID, as described above.

If the policy ID is determined not to be valid at 903, then the process branches to 907, where the server system 202 looks up the valid policy ID for the object handle in the OLS 52, using the global object ID in the object handle as a lookup key. The process then continues to 904.

After 907, or after the policy ID is determined to be valid at 903, the server system 202 looks up in the policy store the policy or policies that correspond to the (valid) policy ID, at 904. At 905 the server system 202 then applies the identified policy or policies. A policy may apply to a specific data object (e.g., "encrypt file A"). A policy can also (or alternatively) apply to a particular client or user (e.g., "Joe is prohibited from accessing file A") or to a particular logical container (e.g., "volume X is read-only"). The server system 202 sends an appropriate response to the client at 906, and the process then ends.

Figure 10:
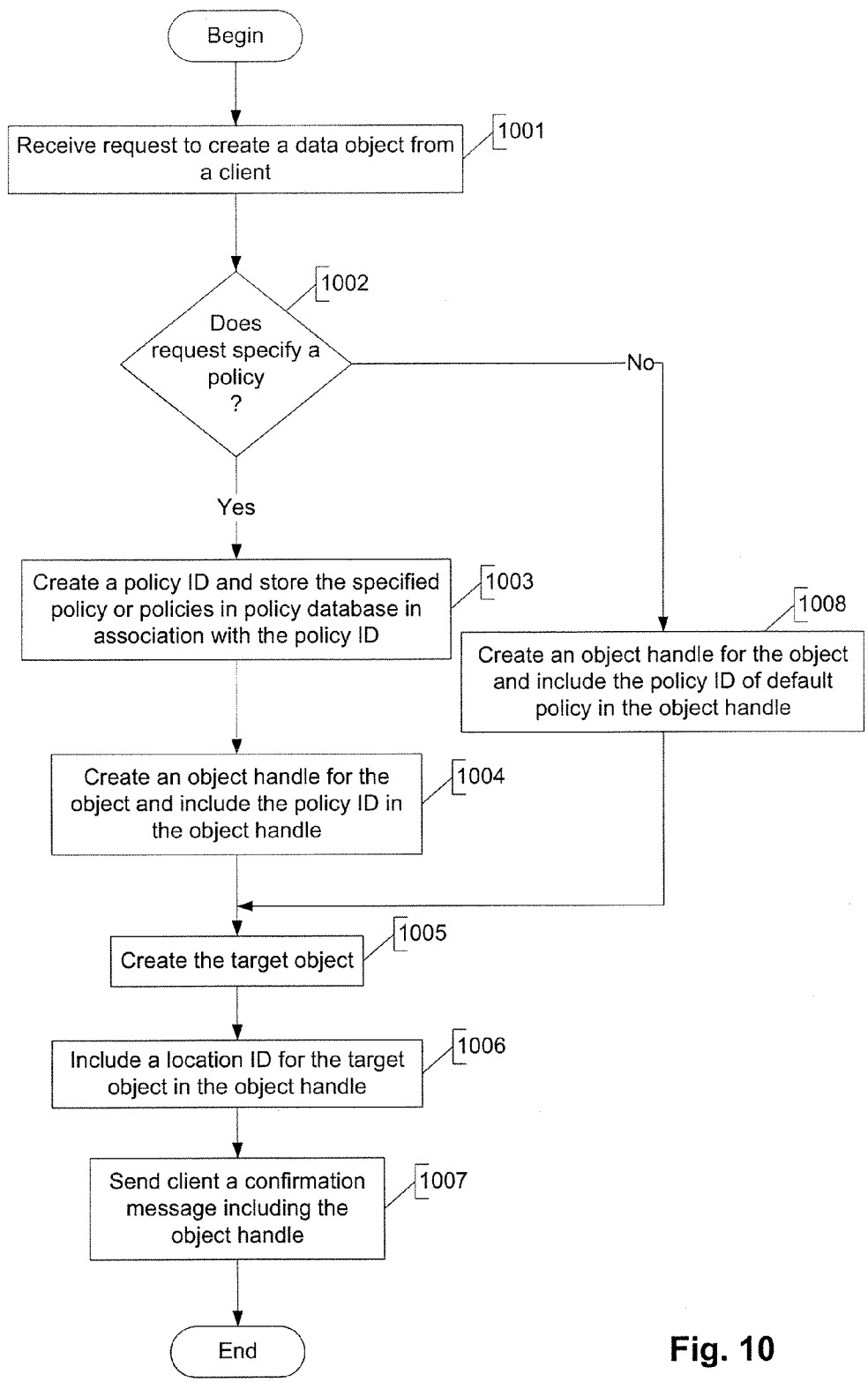
FIG. 10 is a flow diagram showing an example of a process of associating a data object with one or more policies.

FIG. 10 illustrates an example of the process of associating a data object with one or more policies. At 1001 the server system 202 receives from a client 204 a request to create a data object. At 1002 the server system 202 checks whether the request specifies one or more policies for the data object. If the request specifies one or more policies, then at 1003 the server system 202 creates a policy ID and stores the specified policy or policies in the policy store in association with that policy ID. The policies can be expressed in any known or convenient format. The server system 202 then creates an object handle including a global object ID for the object and includes the created policy ID in the object handle at 1004. At 1005 the server system 202 creates the target object. The server system 202 includes in the object handle a location ID identifying the identifying the stored location of the object at 1006. Finally, the server system 202 sends the client a confirmation message including the object handle (including the global object ID, location ID and policy ID) at 1007. The process then ends.

If it is determined at 1002 that the request from the client does not specify a policy, then a default policy or a policy based on the data object's location will be used; accordingly, the process in that case branches to 1008, where the server system 202 creates an object handle for the object and includes the policy ID of the default (or selected) policy in the object handle. The server system 202 then proceeds to 1005 and continues as described above.

Object Location Subsystem (OLS)

The OLS 52 is a mechanism the primary purpose of which is to allow a valid location ID of a data object to be determined from the object's global object ID. However, the OLS 52 also allows the policy ID and/or any other metadata associated with a data object to be identified in essentially the same way. An example of how this can be implemented is described now with reference to FIG. 11.

Figure 11:
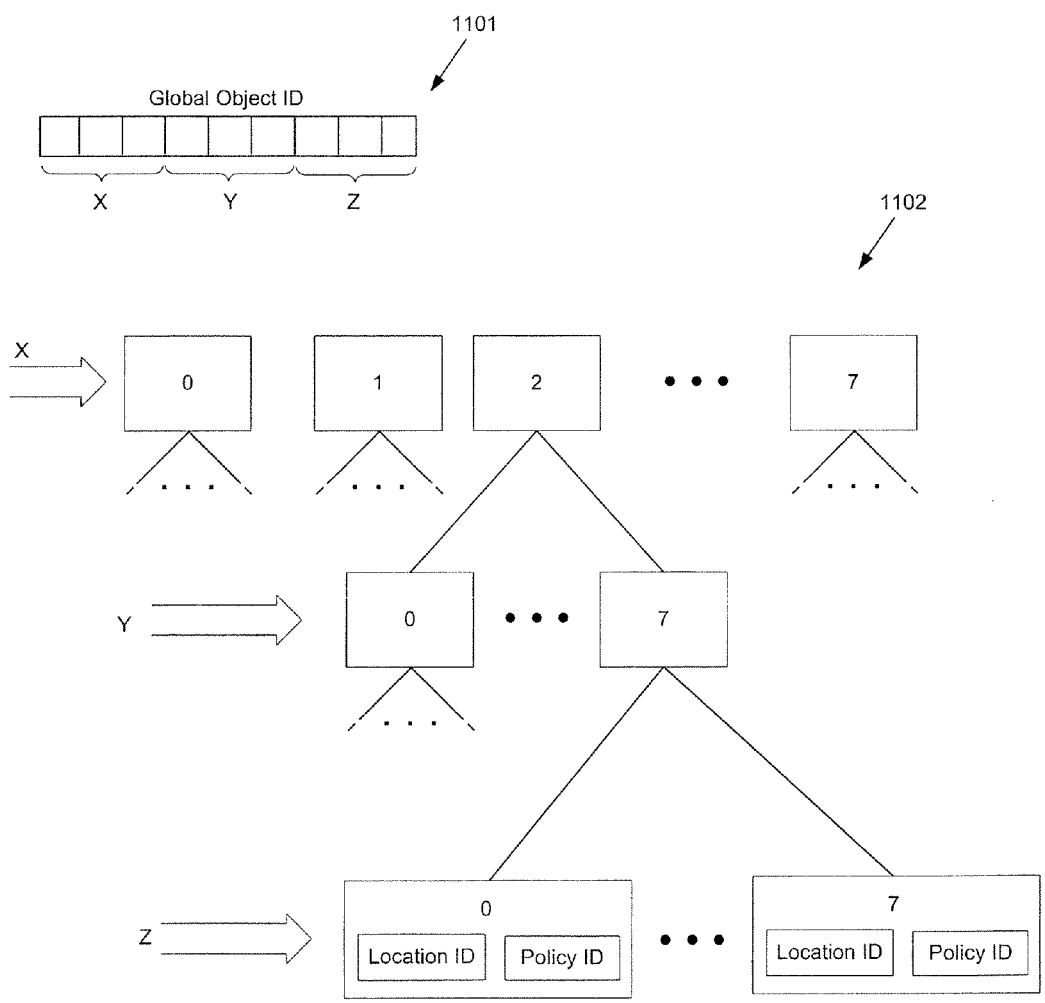
FIG. 11 illustrates how the OLS can use a mapping structure to map a global object ID of an object to a corresponding location ID and policy ID.

In one embodiment, each global object ID used by the server system 202 is a multi-bit entity which is logically divided into multiple segments. Each segment includes at least one bit and typically includes multiple bits. In the example of FIG. 11, a global object ID 1101 is a nine-bit value, which is divided into three segments, X, Y and Z, each of which includes three bits. A first segment X represents the three most significant bits of the global object ID, a second segment Y represents the next most significant bits of the global object ID, and segment Z represents the three least significant bits of the global object ID. These particular numbers of bits and segments are used here only to facilitate description; for any given system, the number of segments and bits in a global object ID can be chosen to accommodate the system's anticipated storage needs (i.e., a greater number of segments/bits allows a greater number of data objects to be represented).

The OLS 52 includes a mapping data structure 1102 (which can be stored in the OLS store 62 in FIG. 6) that maps global object IDs to their corresponding location IDs and policy IDs (and/or any other metadata that may be associated with a data object). Each predefined segment of the global object ID is used to index into a different level of the mapping data structure 1102. In the example of FIG. 11, each three-bit segment of the global object ID can have eight possible values, e.g., 0, 1, 2, . . . , 7, and therefore, can represent eight different entries within a given level of the mapping data structure 1102. For example, the value of segment X is used to select the appropriate entry in the top level of the mapping data structure 1102, the value of segment Y is used to select the appropriate entry in the next lower level of the mapping data structure 1102, and the value of segment Z is used to select the appropriate entry in the lowest level of the mapping data structure 1102. The selected entry in the lowest level contains the current (valid) location ID and policy ID of the global object ID 1101. In this way, the OLS enables the current location ID, policy ID and/or any other metadata associated with a data object to be easily located based on the global object ID of the object.

In one embodiment, each node in the structure depicted in FIG. 11 is a directory in a file system, and the traversal of the tree structure is accomplished by a conventional directory traversal operation performed by the storage manager 460 (FIG. 4) of a D-module 216. In another embodiment, the leaf nodes can contain multiple mappings instead of just one. In that case, the entries in each leaf node have the form <object id least significant bits>:<location ID, policy ID>. That is, the "remaining" least significant bits of the object ID that were not used in the directory traversal to locate the leaf node are used as the lookup key in the directory that is the leaf node.

These nodes (both the leaves and the internal nodes) can reside on any storage container on any D-module 216 in the system. The use of a global namespace in the storage cluster allows the "stitching" of these nodes into a single tree that can be traversed using standard directory tree traversal. By spreading the tree across multiple D-modules 216, the performance of the OLS 52 can be scaled out, and we can avoid the OLS 52 becoming a centralized bottleneck.

Note also that the OLS tree can be populated "on demand" as objects are created that "fall" into specific areas of the tree. This approach represents a trade-off between space and time, i.e., the space consumed for storing potentially unused sections of the tree versus the increased latency of creating objects due to having to create these OLS nodes in line during object creation.

As noted above, the server system 202 logically separates path names from object handles. In a traditional storage system, a file is represented by a path such as "/u/foo/bar/file.doc". In this example, "u" is a directory under the root directory "/", "foo" is a directory under "u", and so on. Each component in this path gets mapped to a specific handle that identifies a specific storage location on a specific storage device. Therefore, the entire path name maps to a specific location, making it very difficult to move files around without having to rename them.

The multi-level object handle technique introduced here allows the server system 202 to break the tight relationship between path names and location that is characteristic of conventional storage systems. In one embodiment, path names in the server system 202 are stored in a POSIX namespace 59 (FIG. 5), which is maintained by the presentation layer 53 and is independent of actual locations of objects. The POSIX namespace 59 includes a data structure for mapping path names to corresponding global object IDs. By using this mapping in conjunction with the OLS 52 (i.e., by mapping path name to global object ID and then mapping global object ID to location ID), the server system 202 can mimic a traditional filesystem hierarchy. In certain embodiments the global object ID is stored within the object handle presented by the NAS protocol, thus avoiding a need to lookup the mapping on every access.

The POSIX namespace 59 together with the OLS 52 thereby provides a layer of indirection between (i.e., provides a logical separation of) path names of stored data objects and the storage locations of the data objects, and also provides a layer of indirection between object identifiers of the stored data objects and the storage locations of the data objects. This separation facilitates transparent migration (i.e., an object can be moved without affecting its name), and moreover, it enables any particular data object to be represented by multiple paths names, thereby facilitating navigation. In particular, this allows the implementation of hierarchical protocol such as NFS on top of an object store, while at the same time maintaining the ability to do transparent migration. For example, when an object is moved to a new location, all that is necessary is update its OLS mapping to point to the new location. After that, subsequent requests by path name are carried out by mapping the existing path name to the existing global object ID and then mapping that global object ID to the new location ID.

The techniques introduced above can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:

storing a data object in a network storage server system, wherein the data object is a sub-volume level data object;

assigning an object identifier to the data object;

creating an object handle in the network storage server system, the object handle including the object identifier and a location identifier, the object identifier being independent of a location at which the data object is stored in the network storage server system, the location identifier being indicative of the location at which the data object is stored within the network storage server system, wherein the location identifier is distinct from the object identifier; and engaging in communications between the network storage server system and a storage client regarding the data object by using the object handle, wherein the object identifier that is independent of the location at which the data object is stored in the network storage server system is used to identify the data object in said communications.

2. A method as recited in claim 1, further comprising:

maintaining, in the network storage server system, a data structure representing a mapping between a location-independent object identifier and a corresponding location identifier for each of a plurality of data objects stored by the network storage server system.

3. A method as recited in claim 2, further comprising:

migrating the data object from a first location to a second location; and updating the location identifier for the data object in an entry for the data object in the data structure to correspond to the second location.

4. A method as recited in claim 3, further comprising:

not notifying the storage client of said migrating or said updating at least until the storage client subsequently attempts to access the data object.

5. A method as recited in claim 2, further comprising:

receiving from the storage client, at the network storage server system, a request relating to the data object, the request including the object handle;

in response to the request, determining whether a location identifier within the object handle in the request is valid;

if the location identifier within the object handle in the request is valid, then using the location identifier within the object handle in the request to access the data object in response to the request; and otherwise, using the object identifier to look up in the data structure a valid location identifier for the data object, and using the valid location identifier to access the data object in response to the request.

6. A method as recited in claim 5, further comprising:

if the location identifier within the object handle in the request is not valid, then sending an updated version of the object handle from the network storage server system to the storage client, the updated version containing the valid location identifier.

7. A method as recited in claim 2, further comprising:

receiving from the storage client, at the network storage server system, a request relating to the data object, the request including an object identifier of the data object but not including a location identifier of the data object;

using the object identifier to look up a valid location identifier for the data object; and using the valid location identifier to access the data object.

8. A method as recited in claim 1, wherein the object handle further includes a policy identifier that identifies a set of one or more data management policies.

9. A method as recited in claim 8, further comprising:
receiving from the storage client, at the network storage server system, a request relating to the data object;
in response to the request, using the policy identifier in the object handle to look up the set of one or more data management policies in a data structure; and
applying the set of one or more data management policies in response to the request.

10. A method as recited in claim 8, wherein the set of one or more data management policies has been previously associated with the data object in response to a request from the storage client.

11. A method as recited in claim 10, wherein the set of one or more data management policies has been previously associated with the data object in response to a request from the storage client to create the data object.

12. A storage server node configured for use in a storage server cluster that includes a plurality of storage server nodes, the storage server node comprising:
a processor;
a D-module configured to provide backend storage and retrieval of data objects in a nonvolatile mass storage facility; and
an N-module configured to provide network communication services to communicate with a storage client over a network, the N-module configured to communicate with the D-module through an interconnect;
the storage server node further configured with the ability to:
assign a location-independent object identifier to a data object, wherein the data object is a sub-volume level data object, the location-independent object identifier being part of an object handle for the data object, the object handle including, in addition to the location-independent object identifier, a location identifier that indicates the location at which the data object is stored in the storage server cluster, wherein the location identifier is distinct from the object identifier, wherein the storage server cluster and a particular storage client use the object handle to engage in communications regarding the data object; and
use the location-independent object identifier included in the object handle to identify the data object in communications with the storage client, the location-independent object identifier being independent of the location at which the data object is stored in the storage server cluster.

13. A storage server node as recited in claim 12, the storage server node further configured to maintain a data structure representing a mapping between a location-independent object identifier and a corresponding location identifier, for each of a plurality of data objects.

14. A storage server node as recited in claim 13, the storage server node further configured with the ability to:
migrate the data object from a first location to a second location; and
update the location identifier for the data object in an entry for the data object in the data structure to correspond to the second location.

15. A storage server node as recited in claim 12, wherein the object handle further includes a policy identifier that identifies a set of one or more data management policies.

16. A storage server node as recited in claim 15, the storage server node further configured with the ability to:
receive from the storage client a request relating to the data object;
in response to the request, use the policy identifier in the object handle to look up the set of one or more data management policies in a data structure; and
apply the set of one or more data management policies in response to the request.

17. A storage server node as recited in claim 16, the storage server node further configured with the ability to associate the data object with the set of one or more data management policies in response to a request from the storage client.

18. A network storage server system comprising:
a processor;
a network interface through which to communicate with a plurality of storage clients over a network;
a storage interface through which to communicate with a nonvolatile mass storage subsystem; and
a memory storing code which, when executed by the processor, causes the processor to perform a plurality of operations, including
storing a data object in a network storage server system, wherein the data object is a sub-volume level data object;
assigning an object identifier to the data object;
creating an object handle in the network storage server system, the object handle including the object identifier and a location identifier, the object identifier being independent of a location at which the data object is stored in the network storage server system, the location identifier being indicative of the location at which the data object is stored within the network storage server system, wherein the location identifier is distinct from the object identifier, wherein the network storage server system and a particular storage client use the object handle to engage in communications regarding the data object; and
using the object identifier included in the object handle to identify the data object in communications between the network storage server system and a storage client, the object identifier being independent of the location at which the data object is stored in the network storage server system.

19. A network storage server system as recited in claim 18, wherein the plurality of operations further include:
maintaining, in the network storage server system, a data structure representing a mapping between a location-independent object identifier and a corresponding location identifier for each of a plurality of data objects stored by the network storage server system.

20. A network storage server system as recited in claim 19, wherein the plurality of operations further include:
migrating the data object from a first location to a second location; and
updating the location identifier for the data object in an entry for the data object in the data structure to correspond to the second location.

21. A network storage server system as recited in claim 20, wherein the plurality of operations further include:
not notifying the storage client of said migrating or said updating at least until the storage client subsequently attempts to access the data object.

22. A network storage server system as recited in claim 19, wherein the plurality of operations further include:

receiving from the storage client, at the network storage server system, a request relating to the data object, the request including the object handle;

in response to the request, determining whether a location identifier within the object handle in the request is valid;

if the location identifier within the object handle in the request is valid, then using the location identifier within the object handle in the request to access the data object in response to the request; and otherwise, using the object identifier to look up in the data structure a valid location identifier for the data object, and using the valid location identifier to access the data object in response to the request.

23. A network storage server system as recited in claim 22, wherein the plurality of operations further include:

if the location identifier within the object handle in the request is not valid, then sending an updated version of the object handle from the network storage server system to the storage client, the updated version containing the valid location identifier.

24. A network storage server system as recited in claim 19, wherein the plurality of operations further include:

receiving from the storage client, at the network storage server system, a request relating to the data object, the request including an object identifier of the data object but not including a location identifier of the data object;

using the object identifier to look up in the data structure a valid location identifier for the data object; and using the valid location identifier to access the data object.

25. A network storage server system as recited in claim 18, wherein the object handle further includes a policy identifier that identifies a set of one or more data management policies.

26. A network storage server system as recited in claim 25, wherein the plurality of operations further include:

receiving from the storage client, at the network storage server system, a request relating to the data object;

in response to the request, using the policy identifier in the object handle to look up the set of one or more data management policies in a data structure; and applying the set of one or more data management policies in response to the request.

27. A network storage server system as recited in claim 26, wherein the set of one or more data management policies has been previously associated with the data object in response to a request from the storage client to associate the set of one or more data management policies with the data object.

\* \* \* \* \*